US006937773B1

(12) United States Patent
Nozawa et al.

(10) Patent No.: US 6,937,773 B1
(45) Date of Patent: Aug. 30, 2005

(54) IMAGE ENCODING METHOD AND APPARATUS

(75) Inventors: Shingo Nozawa, Tokyo (JP); Toshiaki Kondo, Singapore (SG)

(73) Assignee: Canon Kabushiki Kaisha, Tokyo (JP)

( * ) Notice: Subject to any disclaimer, the term of this patent is extended or adjusted under 35 U.S.C. 154(b) by 715 days.

(21) Appl. No.: 09/685,008

(22) Filed: Oct. 6, 2000

(30) Foreign Application Priority Data

Oct. 20, 1999 (JP) ............................................. 11-298660
Oct. 20, 1999 (JP) ............................................. 11-298661

(51) Int. Cl.[7] ............................ G06K 9/36; G06K 9/00; H04N 7/12
(52) U.S. Cl. .................. 382/243; 382/107; 375/240.08; 375/240.11; 375/240.19
(58) Field of Search ............................. 382/245, 236, 382/240, 239, 232, 248, 107, 103; 375/240.15, 240.23, 240.27, 240.08, 240.11, 240.12, 240.18; 714/756, 822, 824

(56) References Cited

U.S. PATENT DOCUMENTS

| 3,890,462 | A | | 6/1975 | Limb et al. ................... 178/6.8 |
| 5,523,850 | A | * | 6/1996 | Kanda et al. .................. 386/25 |
| 5,896,176 | A | * | 4/1999 | Das et al. .............. 375/240.15 |
| 6,025,879 | A | * | 2/2000 | Yoneyama et al. ..... 375/240.24 |
| 6,263,022 | B1 | * | 7/2001 | Chen et al. ............ 375/240.03 |
| 6,496,607 | B1 | * | 12/2002 | Krishnamurthy et al. ... 382/282 |

FOREIGN PATENT DOCUMENTS

| JP | 10-145606 | 5/1998 | ............ H06N/1/41 |
| JP | 10-162118 | 6/1998 | ............. G06T/1/00 |

OTHER PUBLICATIONS

M. Antonini, M. Barlaud, P. Mathieu and I. Daubechies, "Image Coding Using Wavelet Transform", IEEE Transactions on Image Processing, vol. 1, No. 2, Apr. 1992.
J.O. Limb and J.A. Murphy, "Measuring the Speed of Moving Objects from Television Signals", IEEE Transactions on Communications, vol. COM23, pp. 474–478, Apr. 1975.
J.O. Limb and J.A. Murphy, "Estimating the Velocity of Moving Images in Television Signals", Computer Graphics and Image Processing, 4, pp. 311–327, 1975.
Kondo, et al., "Automatic Human Face Detection and Recognition under Non–uniform Illumination", Pattern Recognition, vol. 32, No. 10, pp. 1707–1718, Oct. 1999.

* cited by examiner

*Primary Examiner*—Wenpeng Chen
(74) *Attorney, Agent, or Firm*—Fitzpatrick, Cella, Harper & Scinto

(57) ABSTRACT

An image signal is input from an image input unit and is divided into different spatial frequency bands by applying a discrete wavelet transform thereto using a discrete wavelet transformation unit. On the basis of values of spatial frequency components, a region-of-interest extracts a region of interest by obtaining a distribution of motion vectors in the input image. A quantization unit applies quantization processing to the extracted region of interest and different quantization processing to other regions, and an encoder encodes the quantized image signal. Alternatively, motion of an image contained in the input image may be detected and the region of interest may be obtained based upon motion of this image.

13 Claims, 14 Drawing Sheets

IMAGE ENCODING METHOD AND APPARATUS

FIELD OF THE INVENTION

This invention relates to an image encoding method and apparatus for encoding an input image by applying quantization processing that differs for each region of the image.

BACKGROUND OF THE INVENTION

Recent advances in digital signal processing technology have made it possible to efficiently encode large quantities of digital information such as moving and still pictures and video and to record the encoded information on a small-size magnetic medium or to transmit it to a communication medium.

A technique using the discrete wavelet transform is known as a highly efficient method of encoding an image. In accordance with this technique, the discrete wavelet transform is applied to an input image signal to be encoded. In the discrete wavelet transform, two-dimensional discrete wavelet transform processing is applied to an input image signal, and then a sequence of coefficients obtained by the discrete wavelet transform is quantized.

In such quantization, a region of an image to be encoded to an image quality higher than that of a peripheral portion of an image containing the image region is designated by a user. The coefficients that belong to the designated region are then evaluated, these coefficients are quantized upon raising the precision of quantization a prescribed amount, and encoding is carried out in such a manner that the designated image region can be decoded to an image quality higher than that of the periphery.

With this conventional technique, however, the designation of the image region desired to be encoded to a high image quality is an explicit designation made by the user. The operation demanded of the user is therefore a complicated one.

Further, if it is so arranged that the image region to thus be encoded to a high image quality is determined by automatically discriminating the patterns or colors of this image, a limitation is imposed on the colors or shapes of objects to be encoded to the high image quality and it will not be possible to obtain an object that can be used universally. For example, in a case where video shot by a home digital video camera or the like is to be processed, satisfactory results are not obtained.

Further, the specification of Japanese Patent Application Laid-Open No. 10-145606 describes a region discrimination method as a technique through which a wavelet transform is applied to an input image and a region of interest in the image is extracted using subband signals that are obtained. According to the invention described in this publication, separation of an image region is implemented depending upon whether a wavelet coefficient obtained by applying a Harr wavelet transform to an image signal, i.e., the absolute value of the high-frequency component of the subband signals, is greater than a predetermined threshold value.

With this example of the prior art, however, the purpose is to separate a region having a strong edge from a region having a weak edge by referring to the absolute values of the wavelet coefficients (i.e., of the subband signals). The segmentation of a higher-order multilevel region or the extraction of a region of interest, namely the extraction of a subject of interest from an image region, cannot be carried out.

SUMMARY OF THE INVENTION

An object of the present invention is to provide an image encoding method and apparatus through which diverse image regions can be designated and encoded efficiently without placing a burden upon the user.

Another object of the present invention is to provide an image encoding method and apparatus through which an image region to be encoded to a higher level can be selected and encoded automatically in accordance with the characteristics of the image to be encoded.

A further object of the present invention is to provide an image encoding method and apparatus through which regions of interest are extracted from image data automatically and encoding processing that differs for each extracted region can be executed.

In order to attain the above described objects, an image encoding apparatus of the present invention comprises: image input means for inputting an image signal; band dividing means for dividing the image signal input by said image input means into different spatial frequency bands; region-of-interest extraction means for extracting a region of interest by obtaining a distribution of motion vectors in the image signal based upon values of spatial frequency components of the image signal obtained by the band dividing means; quantization means for applying quantization processing to the region of interest extracted by the region-of-interest extraction means and different quantization processing to other regions, and outputting a quantized image signal; and image encoding means for encoding the quantized image signal quantized by the quantization means.

In order to attain the above described objects, an image encoding apparatus of the present invention comprises: transformation means for applying a discrete wavelet transform to an image signal; motion detection means for detecting motion of an image based upon the image signal; region designation means for designating a region of the image signal based upon information indicating motion of the image detected by the motion detection means; quantization means for quantizing a discrete wavelet transformed output from the transformation means in accordance with the region designated by the region designation means and outputting a quantized image signal; and encoding means for encoding the quantized image signal quantized by the quantization means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

DESCRIPTION OF THE PREFERRED EMBODIMENTS

Preferred embodiments of the present invention will now be described in detail with reference to the accompanying drawings.

[First Embodiment]

Figure 1:
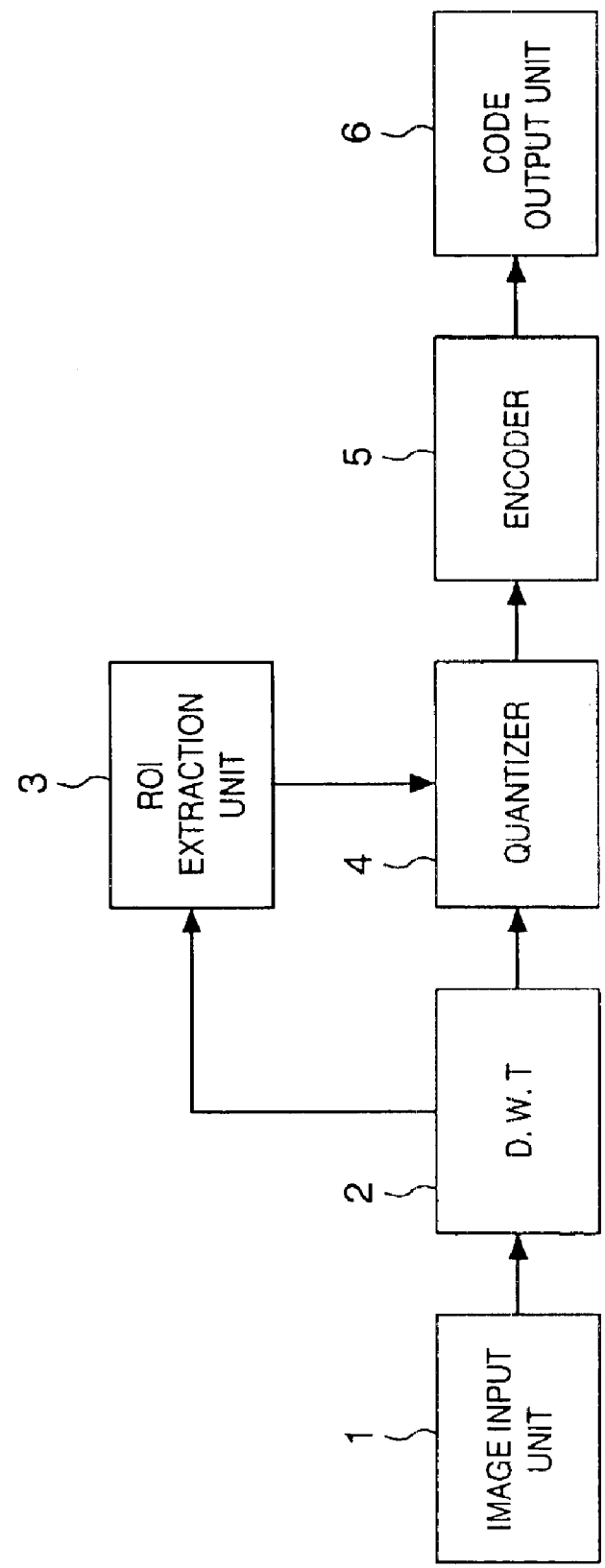
FIG. 1 is a block diagram illustrating the construction of an image encoding apparatus according to a first embodiment of the present invention.

FIG. 1 is a block diagram illustrating the construction of an image encoding apparatus according to a first embodiment of the present invention.

As shown in FIG. 1, the apparatus includes an image input unit 1 for inputting image data. By way of example, the image input unit 1 is equipped with a scanner for reading a document image, with an imaging device such as a digital camera, or with an interface for interfacing a communication line. The input image is applied to a discrete wavelet transformation unit 2, which applies a two-dimensional discrete wavelet transform to the input image. An ROI (Region of Interest) extraction unit 3 extracts an ROI from the image that has entered from the image input unit 1. A quantizer 4 quantizes coefficients obtained by the two-dimensional discrete wavelet transform. An encoder 5 encodes the image signal that has been quantized by the quantizer 4, and a code output unit 6 outputs the code obtained by the encoder 5.

The apparatus according to the first embodiment is not limited to a special-purpose apparatus of the kind shown in FIG. 1 and is applicable also to a case where a program which implements these functions is loaded in, e.g., a general-purpose personal computer or work station and the computer or work station is made to operate in accordance with the program.

The operation of the apparatus will now be described with reference to FIG. 1.

First, an image signal constituting an image to be encoded is input to the image input unit 1 by raster scanning. The input thus entered is input to the discrete wavelet transformation unit 2. In the description that follows, it will be assumed that the image signal that has entered from the image input unit 1 is a monochrome multilevel image. However, if an image signal having a plurality of color components, such as a color image, is input and encoded, it will suffice to compress the RGB color components or the luminance and chromaticity components as well as the monochrome components.

The discrete wavelet transformation unit 2 subjects the input image signal to two-dimensional discrete wavelet transform processing, calculates the transform coefficients and outputs these coefficients. The first embodiment assumes application of the Haar wavelet transform, which best lends itself to hardware implementation. A low-pass filter (referred to as an "LPF" below) employed in the Haar wavelet transform averages mutually adjacent pixels, and a high-pass filter (referred to as an "HPF" below) calculates the difference between the mutually adjacent pixels.

The procedure of two-dimensional discrete wavelet transform processing will be described with reference to FIGS. 2A and 2B.

Figure 2A:
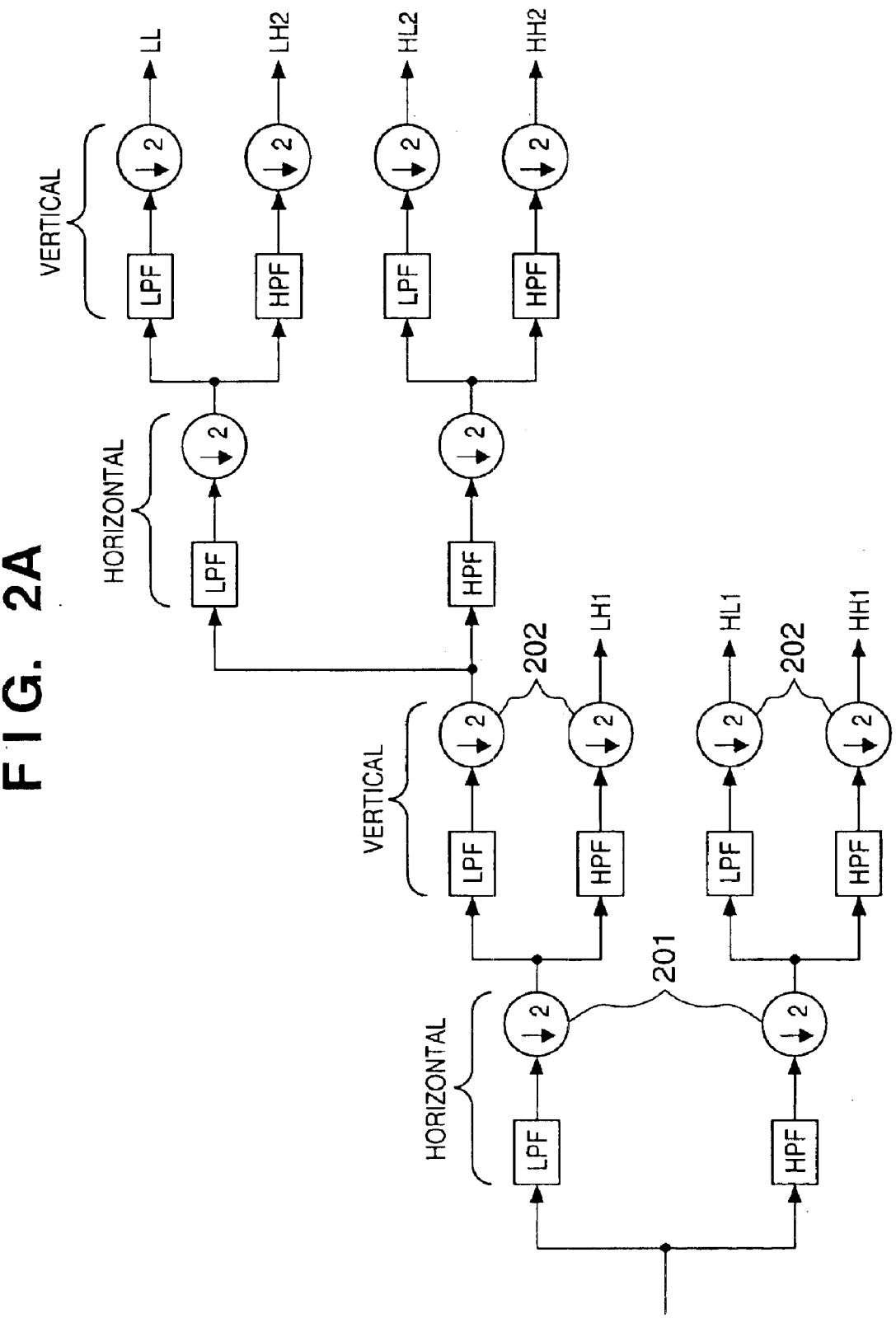
FIGS. 2A and 2B are diagram useful in describing a wavelet transform in a discrete wavelet transformation unit according to the first embodiment.

FIG. 2A is a diagram useful in describing horizontal- and vertical-direction transform processing applied to an input image signal. Filtering by an LPF and an HPF is performed first in the horizontal direction. A sequence of low-pass coefficients and a sequence of high-pass coefficients thus obtained are each downsampled, to half the rate, in the horizontal direction by downsamplers 201. Next, filtering similar to that in the horizontal direction is applied in the vertical direction and then downsampling to half the rate is applied by downsamplers 202 in the vertical direction. By repeatedly executing the same processing to signals of the lowest frequency band, eventually a series of data sequences (LL, LH2, HL2, HH2, LH1, HL1, HH1) belonging to seven different frequency bands are output.

Figure 2B:
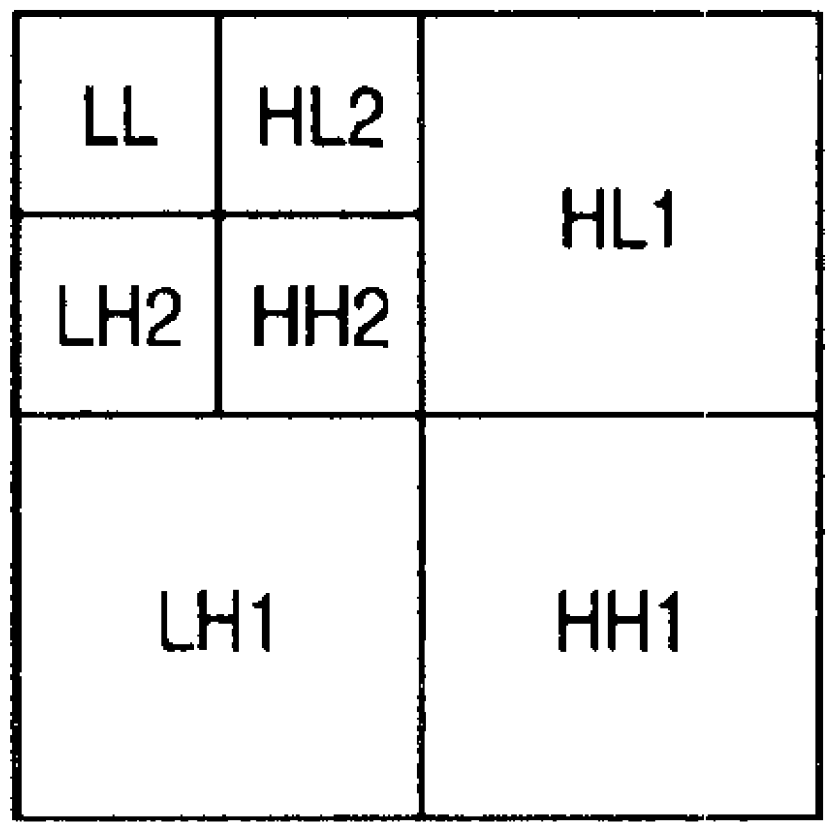

FIG. 2B illustrates the manner in which an input multi-level image signal is divided into different frequency bands as a result of the transform processing shown in FIG. 2A.

As shown in FIG. 2B, the frequency bands are labeled HH1, HL1, LH1, . . . LL. In the description that follows, a single transformation in the horizontal and vertical directions shall be considered to be one level of decomposition, and the frequency bands HH1, HL1, LH1, . . . , LL shall be referred to as "subbands". The principle of image compression based upon this wavelet transform is reported in detail in M. Antonini, M. Barlaud, P. Mathieu and I. Daubechies, "Image Coding Using Wavelet Transform", IEEE Transactions on Image Processing, Vol. 1, No. 2, April 1992.

Figure 3:
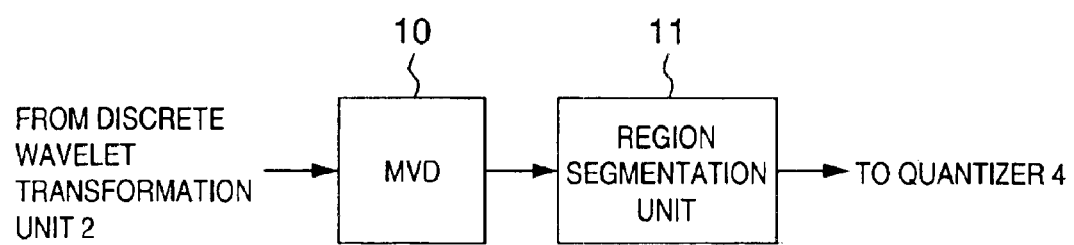
FIG. 3 is a block diagram illustrating the construction of an ROI extraction unit according to the first embodiment.

FIG. 3 is a block diagram useful in describing the construction of the ROI extraction unit 3 according to the first embodiment.

As shown in FIG. 3, the ROI extraction unit 3 includes a motion vector detector (MVD) 10 and a region segmentation unit 11. Subbands obtained by dividing the image signal into the frequency bands using the discrete wavelet transformation unit 2 enter the motion vector detector 10.

Motion-vector estimation is performed based upon the well-known gradient method (also referred to as the temporal-spatial gradient method or temporal-spatial differentiation method, etc.) For a description of the principle of the gradient method, see U.S. Pat. No. 3,890,462; J. O. Limb and J. A. Murphy, "Measuring the Speed of Moving Objects from Television Signals", IEEE Transactions on Communications, Vol. COM23, pp. 474–478, April 1975; and J. O. Limb and J. A. Murphy, "Estimating the Velocity of Moving Images in Television Signals", Computer Graphics and Image Processing, 4, pp. 311–327, 1975. Equations for estimating motion vectors based upon the gradient method are as follows:

$$\alpha = -\Sigma B\{\Delta t(i) \cdot \text{sign}(\Delta x(i))\}/\Sigma B|\Delta x(i)| \quad (1)$$

$$\beta = -\Sigma B\{\Delta t(i) \cdot \text{sign}(\Delta y(i))\}/\Sigma B|\Delta y(i)| \quad (2)$$

where $\alpha$ and $\beta$ represent the results of estimating, in the horizontal and vertical directions, respectively, a motion vector V at a pixel of interest, $\Delta t(i)$ represents the amount of change with time of a pixel value of an i-th pixel neighboring the pixel of interest, $\Delta x(i)$ represents a horizontal spatial gradient at the i-th pixel neighboring the pixel of interest, and $\Delta y(i)$ represents a vertical spatial gradient at the i-th pixel neighboring the pixel of interest. Further, sign (x) represents an operator for extracting the sign bit of an input signal x, and |x| represents an operator for outputting the absolute value of the input signal x. In addition, $\Sigma B$ represents the sum total within a block B comprising a plurality of pixels centered on the pixel of interest. The motion vector V ($\alpha,\beta$) at the pixel of interest is estimated using the temporal change $\Delta t(i)$, horizontal spatial gradient $\Delta x(i)$ and vertical spatial gradient $\Delta y(i)$ of pixel values of all pixels that belong to the block B. The size of the block B in this case is usually 3×3 to 15×15 pixels.

Figure 4:
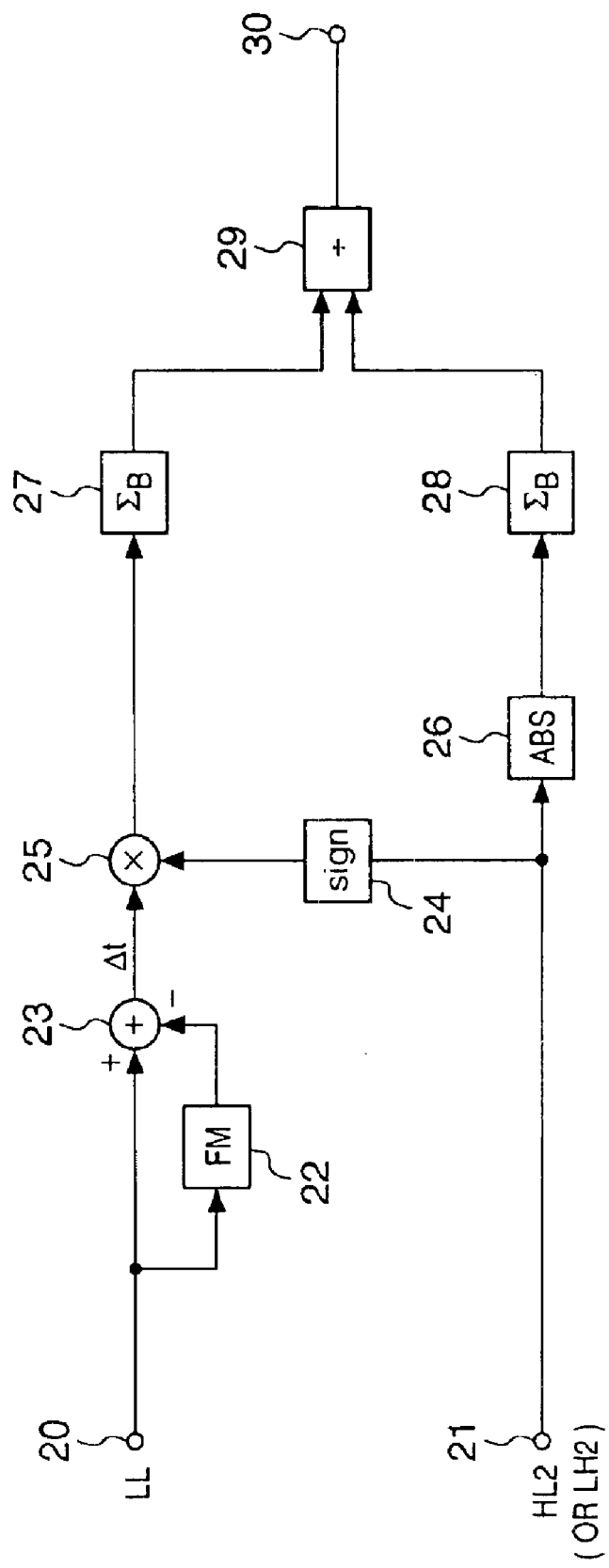
FIG. 4 is a block diagram illustrating the construction of a motion vector detector according to the first embodiment.

FIG. 4 is a block diagram showing the details of the motion vector detector 10.

As shown in FIG. 4, the motion vector detector 10 includes an input unit 20 for inputting a subband LL; an input unit 21 for inputting a subband HL2 or LH2; an image memory 22 such as a frame memory; an adder 23 for performing addition or subtraction; a sign output unit (sign) 24 for extracting the sign bit of input data; a multiplier 25; an absolute-value output unit (ABS) 26 for outputting the absolute value of input data; accumulators ($\Sigma B$) 27, 28 for performing cumulative addition; a divider 29 for executing division; and an output unit 30 for outputting the estimated value of a motion vector.

The subband LL that has entered from the input unit 20 is subtracted from the subband LL of the preceding frame, which has arrived via the image memory 22, by the adder 23, whereby temporal change $\Delta t$ of the pixel value is calculated. Meanwhile, the subband HL2 or LH2 enters directly from the input unit 21, taking note of the fact that the horizontal and vertical spatial gradients $\Delta x$, $\Delta y$ of the image have already been operated on as subbands HL2, LH2, respectively. The sign of each pixel of the subband HL2 or LH2 is output from the sign output unit 24 and applied to the multiplier 25. The latter multiplies the temporal change $\Delta t$ of the pixel value by the sign of the spatial gradient that enters from the input unit 21. The absolute-value output circuit 26 calculates the absolute value of the pixel value of each pixel in the entered subband HL2 or LH2. From the block comprising the plurality of neighboring pixels centered on the pixel of interest, the accumulators 27, 28 cumulatively add the values (the outputs of the multiplier 25) obtained by multiplying the temporal change $\Delta t$ by the sign of the spatial gradient, and the absolute values (the outputs of the absolute-value output circuit 26) of the spatial gradient $\Delta x$ or $\Delta y$, respectively. More specifically, the accumulator 27 calculates the numerators of Equations (1), (2) and the accumulator 28 calculates the denominators of Equations (1), (2). Finally, the divider 29 performs the division in accordance with Equations (1), (2) and the output unit 30 outputs the horizontal component $\alpha$ or vertical component $\beta$ of the motion vector. In accordance with the procedure described above, a minute distribution of motion vectors can be obtained over the entire area of the input image.

Next, the region segmentation unit 11 subjects the image to region segmentation by referring to the distribution of motion vectors detected by the motion vector detector 10. Within the image to be encoded, a region (ROI) that is to be decoded at a quality higher than that at the image periphery is decided and mask information indicating which coefficients belong to the designated region is generated when the image of interest is subjected to the discrete wavelet transform. It should be noted that the determination of the ROI can be performed by referring to the picture-taking mode of the camera. For example, if the camera is in a tracking photographic mode, the subject (the ROI) is substantially stationary at the center of the picture and the background travels in conformity with the motion of the subject. If the camera is set to a mode for photography using a tripod, the subject (the ROI) will move freely within the picture and the background will be substantially stationary. Accordingly, which region in the input image is the present ROI can be determined from the mode of photography.

Figure 5A:
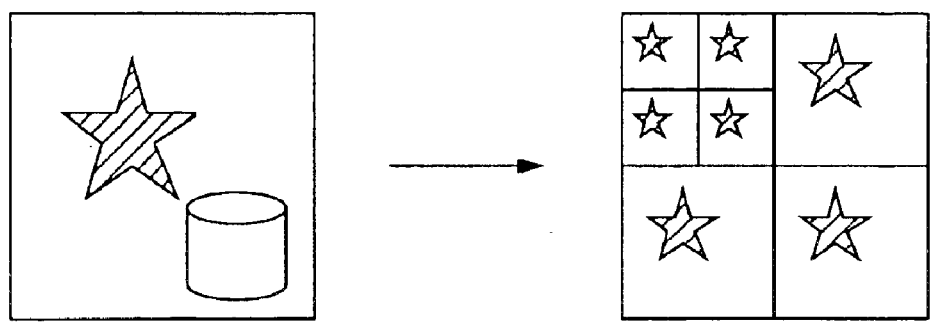
FIGS. 5A, 5B and 5C are diagrams useful in describing an ROI mask and a quantization method according to the first embodiment.

FIG. 5A is a conceptual view for describing an example of a case where mask information for extracting only the ROI or for excluding only the ROI is generated.

If a star-shaped ROI exists in an image, as indicated on the left side of FIG. 5A, the region segmentation unit 11 extracts the ROI based upon the motion-vector distribution information and calculates the portion of each subband occupied by this ROI. The region indicated by the mask information is a domain, which includes the transform coefficients of the periphery, necessary when decoding the image signal on the boundary of the ROI. An example of the mask information thus calculated in shown on the right side of FIG. 5A. In this example, mask information for when a two-level two-dimensional discrete wavelet transform is applied to the image on the left side of FIG. 5A is calculated in the manner shown on the right side of FIG. 5A. In FIG. 5A, the star-shaped portion is the ROI, the bits constituting the mask information within this region are "1"s and the bits of the other region information are "0"s. The entirety of this mask information is identical with the constitution of the transform coefficients obtained by the two-dimensional discrete wavelet transform. By scanning the bits within the mask information, therefore, it is possible to identify whether the coefficients at the corresponding positions fall within the designated region.

The mask information thus produced is applied to the quantizer 4. Furthermore, the region segmentation unit 11 receives an input of a parameter, which specifies the image quality of the designated ROI, from an input unit (e.g., a keyboard or a pointing device such as a mouse), which is not shown. The parameter may be a numerical value expressing a compression rate assigned to the designated region, or a numerical value representing the image quality of this region. On the basis of this parameter, the region segmentation unit 11 calculates a bit-shift quantity W for the coefficients in the ROI and outputs this to the quantizer 4 together with the mask information.

The quantizer 4 quantizes the transform coefficients from the discrete wavelet transformation unit 2 by a predetermined quantization step $\Delta$ and outputs indices corresponding to the quantized values. Quantization is carried out in accordance with the following equations:

$$q = \text{sign}(c) \cdot \text{floor}(|c|/\Delta) \quad (3)$$

$$\text{sign}(c) = 1; \ c \geq 0 \quad (4)$$

$$\text{sign}(c) = -1; \ c < 0 \quad (5)$$

where c represents a coefficient that undergoes quantization and floor(x) is a function for outputting the largest integral value that is smaller than x. Further, in the first embodiment, it is assumed that "1" is included as a value of the quantization step Δ. When the value is "1", this is equivalent to a situation in which quantization is not carried out.

Next, the quantizer 4 changes the quantization indices in accordance with the following equations based upon the mask information and shift quantity W that has entered from the ROI extraction unit 3:

$$q'=q \cdot 2^w; \ m=1 \qquad (6)$$

$$q'=q; \ m=0 \qquad (7)$$

where m represents the value of mask information at the position of the quantization index. By virtue of the processing described above, only a quantization index that belongs to the designated spatial region is shifted up by W bits in the ROI extraction unit 3.

Figure 5B:
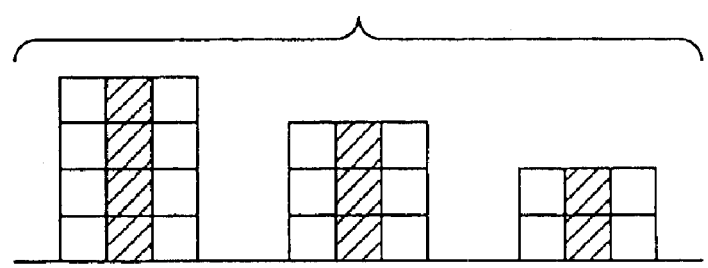
Figure 5C:
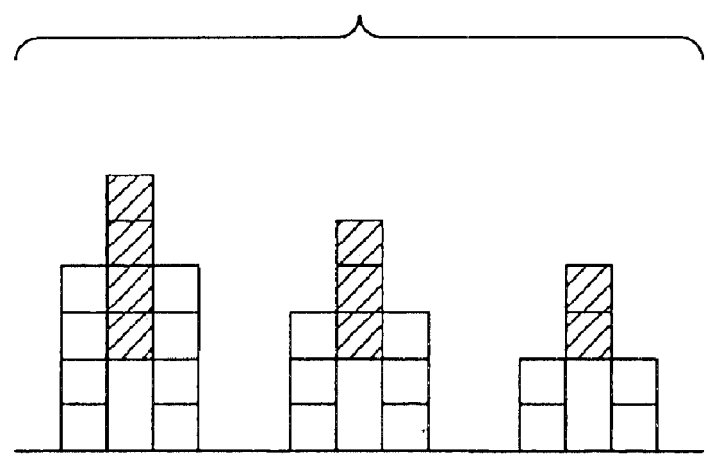

FIGS. 5B and 5C are diagrams useful in describing a change in quantization index by such shift-up.

In FIG. 5B, three quantization indices exist in three subbands. If the value of mask information of a quantization index that has been subjected to screening is "1" and the number W of shifts is "2", then the quantization indices after the shift will be as shown in FIG. 5C. The quantization indices that have been changed in this manner are output to the encoder 5.

In this embodiment, entropy encoding is used as the encoding method in the encoder 5. Entropy encoding will be described below.

The encoder 5 decomposes entered quantization indices into bit planes, applies binary arithmetic encoding on a per-bit-plane basis and outputs a code sequence.

Figure 6:
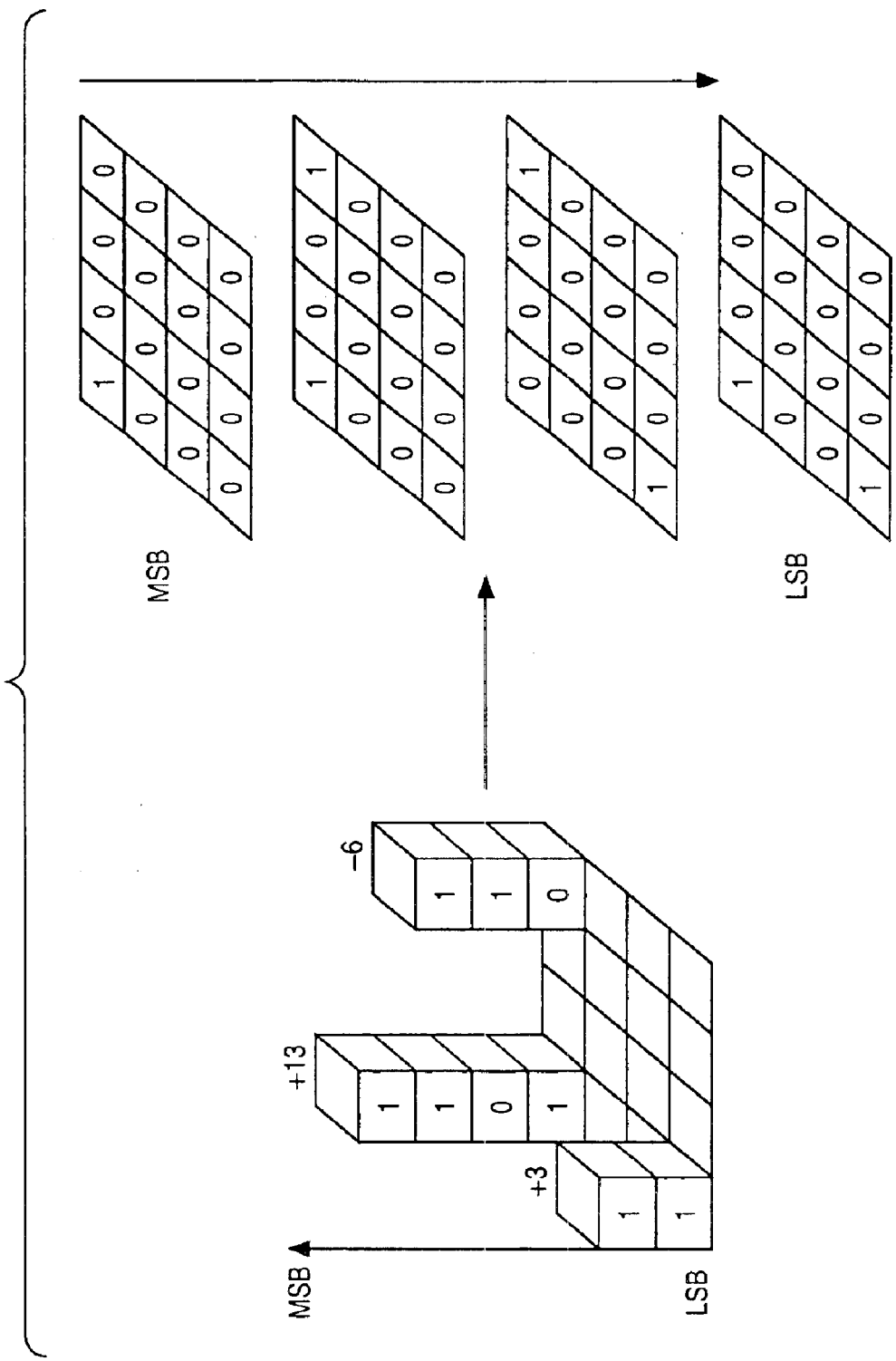
FIG. 6 is a diagram useful in describing entropy encoding.

FIG. 6 is a diagram useful in describing the operation of the encoder 5. In this example, three non-zero quantization indices exist in a region within a subband having a size of 4×4, and the values of these indices are "+13", "−6" and "+3". The encoder 5 obtains a maximum value M by scanning this region and, in accordance with the following equation, calculates a number S of bits necessary to express the maximum quantization index:

$$S=\text{ceil}(\log_2(|M|)) \qquad (8)$$

where ceil(x) is a function for outputting the smallest integral value that is greater than x.

In FIG. 6, the maximum coefficient value is "13" and therefore the value of S is "4" and the 16 quantization indices in the sequence are processed in units of the four bit planes, as shown in FIG. 6.

First, the entropy encoder 5 applies binary arithmetic encoding to each bit of the most significant bit plane (represented by MSB in FIG. 6) and outputs the encoded bits as a bit stream. Next, the bit plane is lowered by one level and the process is repeated. This processing is repeated until the bit plane of interest reaches the least significant bit plane (represented by LSB), with each bit of the bit planes being encoded and output to the code output unit 6. If an initial non-zero bit is detected in the scanning of the bit planes, then the code of this quantization index undergoes entropy encoding immediately thereafter. The encoded image signal is finally output from the code output unit 6.

Thus, in accordance with the first embodiment as described above, the following effects are obtained:

(1) Using a subband signal obtained by applying a wavelet transform to an input image makes it possible to estimate a motion vector within this input image. Accordingly, the wavelet transform can be used not only for encoding an image but also for ROI extraction without requiring a large-scale modification or increase in hardware.

(2) As a result, an image signal can be compressed more efficiently as by using a certain quantization step width for an extracted ROI and a different quantization step width for a non-ROI.

(3) Since ROI extraction is performed using a subband signal of a reduced sampling rate as the target, processing is quick.

In the first embodiment, the Haar wavelet transform is applied to an image signal. However, similar results can be obtained with any wavelet transform in which the high-pass filter (HPF) reflects the spatial gradient of the image.

Further, in the wavelet transform, the same filtering processing is repeatedly applied to the subband of the minimum frequency of the input image, whereby the input image is converted to multiple resolutions in a pyramid structure. Accordingly, detection of a motion vector in the first embodiment means not only extraction independently from a subband signal in a specific region, as described above. For example, it is possible to estimate a motion vector rapidly at a coarse resolution and, by referring to this low-resolution motion vector, to precisely estimate motion vectors in subband signals having a gradually higher resolution.

[Second Embodiment]

In the first embodiment described above, motion vectors within an image are detected minutely using subband signals obtained by application of the Haar wavelet transform, and an ROI is extracted based upon the distribution of these motion vectors. In the second embodiment, an ROI having left-right symmetry is extracted within an image having substantial left-right symmetry, such as an image of the human face, using subband signals obtained by application of the Haar wavelet transform in a manner similar to that of the first embodiment.

Figure 7:
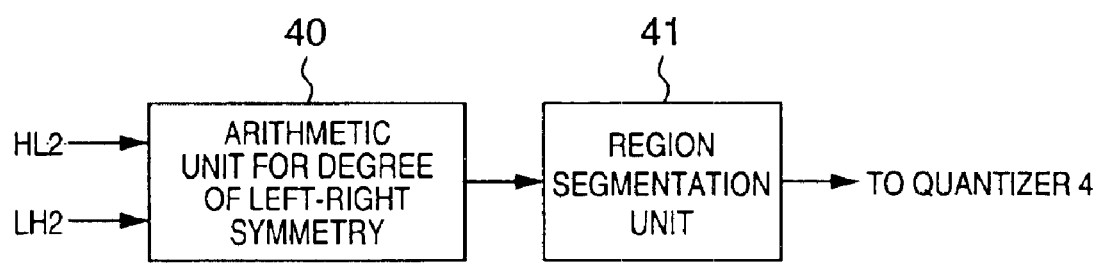
FIG. 7 is a block diagram illustrating the construction of an ROI extraction unit according to a second embodiment of the present invention.

FIG. 7 is a block diagram illustrating the construction of the ROI extraction unit 3 according to the second embodiment for extracting an ROI having left-right symmetry. The ROI extraction unit 3 includes an arithmetic unit 40 for calculating degree of left-right symmetry and a region segmentation unit 41.

As shown in FIG. 7, in subbands obtained from the preceding two-dimensional discrete wavelet transformation unit 2, HL2 having horizontal spatial-gradient information and LH2 having vertical spatial-gradient information are input to the arithmetic unit 40 for calculating degree of left-right symmetry. A method in which the similarity of brightness or color on the left and right sides of the ROI is evaluated as a yardstick of light-right symmetry is a direct approach. However, since the luminance and color of an image are readily influenced by illumination, this evaluation method does not necessarily provide stable results. Accordingly, in the second embodiment, information concerning the orientation of the spatial gradient of an image is utilized as an indicator that is not readily susceptible to the lighting conditions. (For example, see the specification of Japanese Patent Application Laid-Open No. 10-162118 or Toshiaki Kondo and Hong Yan, "Automatic Human Face Detection and Recognition under Non-uniform Illumination", Pattern Recognition, Vol. 32, No. 10, pp. 1707–1718, October 1999.)

Extraction of a region having left-right symmetry utilizing information relating to the orientation of the spatial gradient of an image will be considered. To accomplish this, a region of interest having a regular shape, such as a rectangular or elliptical block, is set within an input image, the region of interest is shifted in position incrementally within the input image and, each time a shift is made, the degree of left-right symmetry is calculated. Since the region of interest has left-right symmetry, the spatial gradients of pixels at corresponding positions on the left and right sides of a perpendicular axis which crosses this region must satisfy the following two conditions:

(i) the orientations of the gradients in the horizontal direction are opposite each other; and (ii) the orientations of the gradients in the vertical direction are identical.

Orientation θ of a spatial gradient is expressed by Equation (9) below as the ratio of gradient Δx in the horizontal direction to gradient Δy in the vertical direction at each pixel.

$$\theta(x,y) = \tan^{-1}(\Delta y/\Delta x) \quad (9)$$

where "tan$^{-1}$" represents arc tangent (arctan). Taking note of the fact that the horizontal and vertical spatial gradients Δx, Δy of the image have already been calculated as subbands HL2, LH2, respectively, Equation (9) can be rewritten as Equation (10) below.

$$\theta(x,y) = \tan^{-1}(LH2/HL2) \quad (10)$$

According to the second embodiment, therefore, the orientation of a spatial gradient is found by implementing Equation (10) making direct use of the outputs LH2, HL2 of the discrete wavelet transformation unit 2. Though Equation (10) may be evaluated as is using real numbers, the operation can be executed more simply and at higher speed if a look-up table is utilized. Next, degree γ of symmetry at each position (x,y) of the image is found. According to the second embodiment, γ(x,y) is defined as indicated by Equation (11) below using θ(x,y).

$$r(x, y) = \sum_{j=y-v/2}^{y+v/2} \sum_{i=x-h/2}^{x} [|\cos(\theta(i, j)) + \cos(\theta(2x - i, j)|^2 + |\sin(\theta(i, j) - \sin(\theta(2x - i, j))|^2] \quad (11)$$

Equation (11) will be described with reference to FIG. 8, which illustrates a rectangular block to be operated on in order to calculate the degree γ of symmetry.

Figure 8:
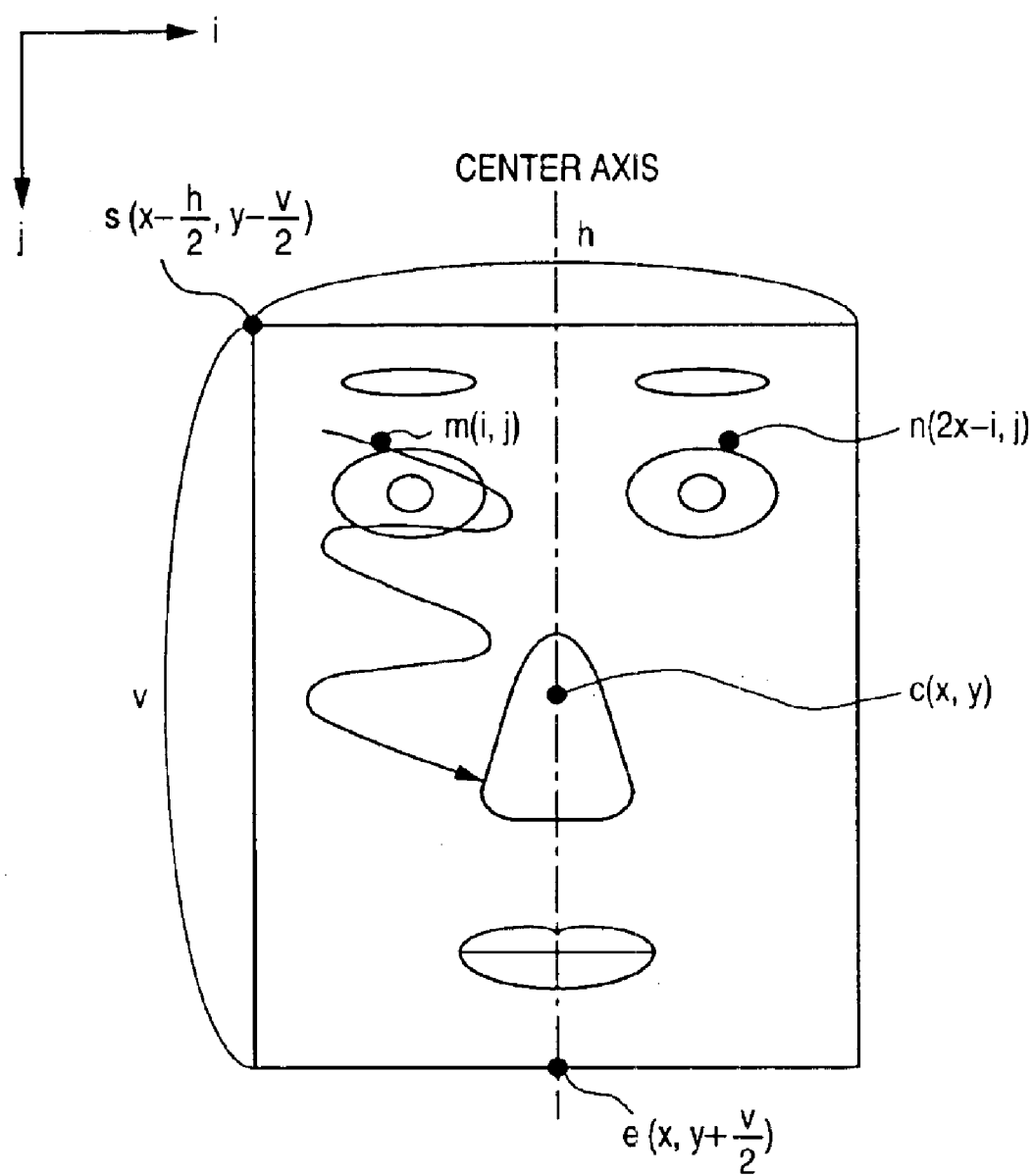
FIG. 8 is a diagram useful in describing the notation of an equation for calculating degree of left-right symmetry according to the second embodiment.

In FIG. 8, h represents the size of the block in the horizontal direction, v the size of the block in the vertical direction, and (x,y) the position of the center c of the block. Calculation of the degree γ of symmetry is performed while raster-scanning a pixel of interest from a pixel s (x−h/2,y−v/2) to a pixel e (x,y+v/2) within the left half of the block in the manner illustrated. For example, when the pixel of interest is m, the degree γ of symmetry is calculated using spatial-gradient information at the pixel m and the amount of the spatial gradient at a pixel n, which is located at a position symmetrical with respect to the pixel m. If the degree of left-right symmetry is high, the first and second terms of Equation (11) both become small values owing to cancellation within the terms. Though the absolute values are squared in Equation (11), the degree γ of symmetry may simply be the sum of the absolute values. Though the size of the area to be operated on approximately agrees with the size of a face to be detected, a block having a size that differs in several stages may be used if the size of the face is unknown.

The region segmentation unit 41 extracts only a region having high degree if left-right symmetry based upon the results from the arithmetic unit 40 for calculating the degree of left-right symmetry and then decides the region that corresponds to the human face from the extracted region. In order to decide the position of the human face from the region of high left-right symmetry, any method whose purpose is to extract a human face may be employed, such as making combined use of template matching using the template of a human face, a search for a flesh-tone region or elliptical region and motion-vector information obtained in accordance with the first embodiment.

Since extraction of an ROI in the second embodiment is such that a specific region having left-right symmetry is extracted in an efficient manner, the method of extraction is highly effective when photographing a human being. Accordingly, in a case where the image input unit 1 is a camera or the like, the function of the second embodiment is turned on when a mode for photographing a human being or a portrait mode is selected in association with the picture-taking mode. When another type of photographic mode is in effect, a default is set so as to turn the function of the second embodiment off.

In accordance with the second embodiment, as described above, the following advantages are obtained:

(1) A region in an input image having left-right symmetry can be extracted in a simple manner using subband signals obtained by applying a wavelet transform to the input image. Accordingly, the wavelet transform can be exploited not only for encoding an image but also for ROI extraction without requiring a large-scale modification or increase in hardware.

(2) As a result, an image signal can be compressed more efficiently as by using a certain quantization step width for an extracted ROI and a different quantization step width for a non-ROI.

(3) Since ROI extraction is performed using a subband signal of a reduced sampling rate as the target, processing is quick.

(4) The arithmetic unit 40 for calculating degree of left-right symmetry utilizes only the gradient direction of an image. As a result, there is little influence from changes in lighting conditions and a region of left-right symmetry can be detected in stable fashion. Further, since a specific region having left-right symmetry is found, regions that are candidates for a human face can be narrowed down efficiently regardless of whether the background is complicated or simple.

(5) By determining the position of a face through application of pattern matching solely to portions having a high degree of left-right symmetry, a human face can be detected highly precisely and at high speed while greatly reducing the amount of pattern-matching processing.

In the second embodiment, the Haar wavelet transform is utilized. However, similar results can be obtained also if the HPF used in the Haar wavelet transform is of the quadratic differential type, such as a Laplacian filter.

[Third Embodiment]

In the first embodiment described above, motion vectors within an image are detected minutely utilizing subband signals obtained by application of the Haar wavelet transform, and an ROI is extracted based upon the distribution of these motion vectors. In the second embodiment, an ROI having left-right symmetry is extracted in similar fashion using subband signals obtained by application of the Haar wavelet transform. Next, in the third embodiment, segmentation of an input image into regions is carried out utilizing subband signals obtained by application of a wavelet transform and a region of interest in the input image is extracted.

An image having a low resolution often is used to perform region segmentation efficiently. The reason for this is that a region within an image contains more global image information, unlike edge information, for example. Accordingly, first the input image is subjected to region segmentation coarsely using the subband signal LL of the lowest frequency band. According to the third embodiment, the quad-tree segmentation method is utilized for region segmentation. However, the present invention is not limited to the quad-tree segmentation method. Any other method such as the clustering method or histogram-base technique may be used.

Quad-tree segmentation segments an image into regions through the following steps:

(1) Processing is started using the input image, namely the subband signal LL in this embodiment, as one image region.

(2) Homogeneity, e.g., a variance value, within the region is calculated. If the variance value exceeds a fixed value, the region is judged to be non-homogeneous and is split into four equal regions.

(3) If mutually adjacent split regions satisfy the condition for homogeneity, i.e., exhibit variance values that are equal to or less than the fixed value, these regions are merged.

(4) The above-described steps are repeated until splitting and merging no longer occur.

Thus, an input image can be segmented into regions coarsely on a block-by-block basis. If an input image consists of a comparatively simple pattern, calculation can be simplified using the difference between maximum and minimum values in segmented regions as a criterion for evaluating homogeneity.

Next, edge distribution edge(i,j) is found using subband signals LH2, HL2.

Edge strength can expressed by the following equation:

$$\text{edge}(i,j) = |LH2(i,j)| + |HL2(i,j)| \qquad (12)$$

As a result of the quad-tree segmentation described above, the boundary of this segmented region generally consists of connected minute blocks. Accordingly, in a region in which these minute blocks are connected, pixels of a strong edge defined by Equation (12) are traced and the resulting path is decided upon as being the true boundary line.

According to the third embodiment, as described above, a region of interest cannot be specified even though an image can be segmented. However, the following effects can be obtained by combining the third embodiment with the first and/or second embodiments or by adding on initial information concerning a region of interest:

(1) In a case where the input image is a sequence of moving pictures, a region of interest can be specified from the motion-vector distribution, which was described in the first embodiment, and the picture-taking mode, and the contour of this region of interest can be finalized as the true contour through the procedure set forth above.

(2) In a case where a human face is to be extracted, a boundary line defining an elliptical shape can be finalized as the contour through the above-described procedure by focusing upon the axes of symmetry of a symmetric region as described in the second embodiment.

(3) If a region of interest is designated at the start in a case where the input image is a sequence of moving pictures, then the contour of this region of interest can be traced by repeating the above-described procedure.

[Fourth Embodiment]

Figure 9:
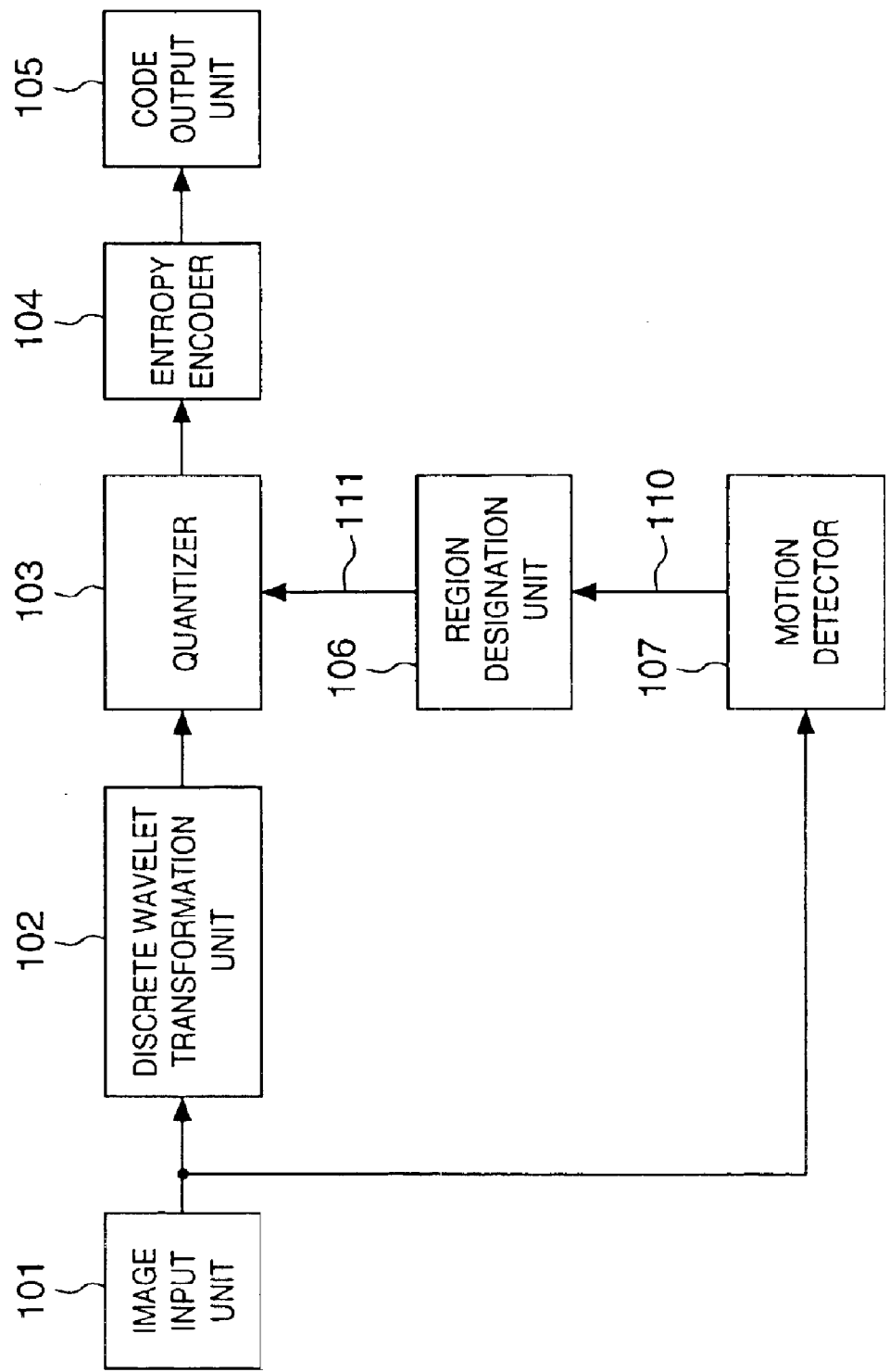
FIG. 9 is a block diagram illustrating the construction of an image encoding apparatus according to a fourth embodiment of the present invention.

FIG. 9 is a block diagram illustrating an example of the construction of an image encoding apparatus according to a fourth embodiment of the present invention.

As shown in FIG. 9, the apparatus includes an image input unit 101 for inputting image data. By way of example, the image input unit 101 is equipped with a scanner for reading a document image, with an imaging device such as a digital camera, or with an interface for interfacing a communication line. The input image is applied to a discrete wavelet transformation unit 102, which applies a two-dimensional discrete wavelet transform to the input image. A quantizer 103 quantizes a sequence of transform coefficients obtained by the two-dimensional discrete wavelet transformation unit 102, and an entropy encoder 104 applies entropy encoding to the image signal quantized by the quantizer 103. A code output unit 105 outputs the code obtained by the encoder 104. A motion detector 107 detects the motion of an object in the image that has entered from the image input unit 101. On the basis of the motion of the object in the image detected by the motion detector 107, a region designation unit 106 determines a region to be subjected to a particularly high degree of encoding, sends the result of determination to the quantizer 103 and instructs the quantizer 103 to perform quantization. The components 101 to 106 in FIG. 9 correspond to the components 1 to 6, respectively, in FIG. 1. Though the motion vector detector 10 shown in FIG. 3 detects the motion of an image based upon subbands after application of the wavelet transform, the motion detector 107 in this embodiment detects motion based upon the original image signal. Further, the apparatus according to the fourth embodiment is not limited to a special-purpose apparatus of the kind shown in FIG. 9 and is applicable also to a case where a program which implements these functions is loaded in, e.g., a general-purpose personal computer or work station and the computer or work station is made to operate in accordance with the program.

The operation of the apparatus will now be described with reference to FIG. 9.

First, an image signal constituting an image to be encoded is input to the image input unit 101 by raster scanning. The input thus entered is input to the discrete wavelet transformation unit 102 and to the motion detector 107. In the description that follows, it will be assumed that the image signal that has entered from the image input unit 101 is a monochrome multilevel image. However, if an image signal having a plurality of color components, such as a color image, is input and encoded, it will suffice to compress the RGB color components or the luminance and chromaticity components as the monochrome components.

The discrete wavelet transformation unit 102 subjects the input image signal to two-dimensional discrete wavelet transform processing and applies the sequence of coefficients resulting from the transformation to the quantizer 103. As is well known, a two-dimensional discrete wavelet transform can be expressed by successively applying a one-dimensional discrete wavelet transform successively in the horizontal and vertical directions of the image. A one-dimensional discrete wavelet transform divides the input signal into low- and high-frequency components by prescribed low- and high-pass filters and downsamples each of these components to half the number of samples.

On the basis of the image signal supplied by the image input unit 101, the motion detector 107 detects a region of motion within the image and supplies the region designation unit 106 with a detection signal 110 indicative of the result of detection. When the detection signal 110 enters, the region designation unit 106 outputs region information 111, which is for instructing the quantizer 103 to execute highly efficient encoding.

Figure 10:
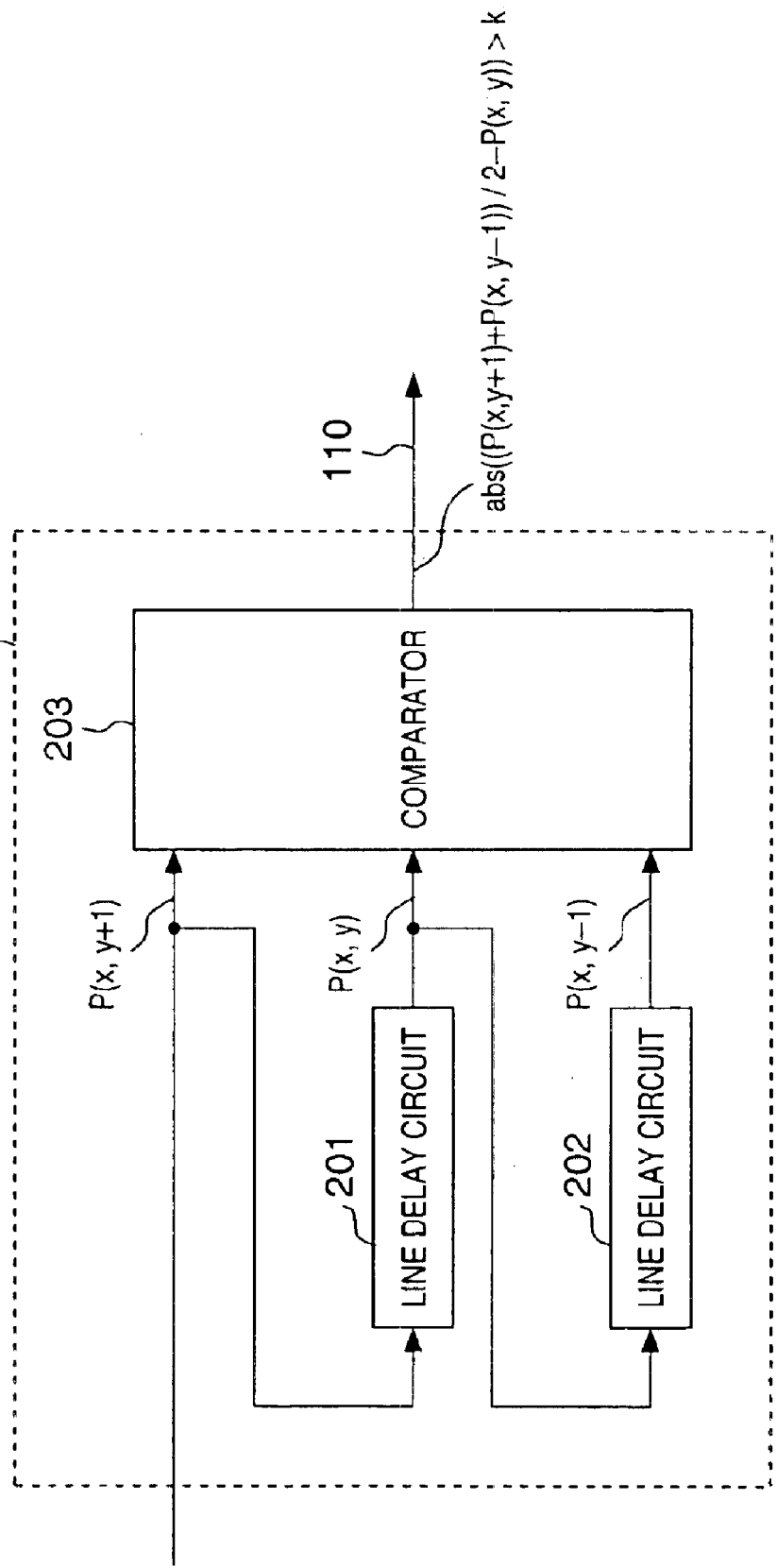
FIG. 10 is a block diagram illustrating the construction of a motion vector detector according to the fourth embodiment.

FIG. 10 is a block diagram illustrating an example of the construction of the motion detector 107 according to the fourth embodiment. This arrangement is applied to a case where the input image signal is an interlaced image signal typified by a television signal.

As shown in FIG. 10, the motion detector 107 includes line delay circuits 201, 202 and a comparator 203. The image signal from the image input unit 101 is supplied to the comparator 203 along a total of three paths, namely a path P(x,y+1) leading directly to the comparator 203, a path P(x,y) via the line delay circuit 201 and a path P(x,y−1) via both line delay circuits 201 and 202. The line delay circuits 201 and 202 are each single-pixel delay circuits corresponding to one horizontal line of the image signal. Accordingly, sets of three pixels arrayed vertically are supplied to the comparator 203 sequentially. The comparator 203 compares the average value of the upper and lower pixels of the three vertically arrayed pixels of the set with the value of middle pixel and determines whether the difference between the compared values exceeds a predetermined quantity. More specifically, the comparator 203 detects motion between fields in the interlaced image signal and supplies the result to the region designation unit 106.

According to the fourth embodiment, the detection signal 110 is output as a high-level signal if the following relation holds:

$$abs\{(x,y+1)+p(x,y-1))/2-P(x,y)\}>K \qquad (13)$$

where K represents a predetermined value. It should be noted that $abs\{(x,y+1)+p(x,y-1))/2-P(x,y)\}$ in Equation (13) indicates the absolute value of the difference between the value of P(x,y) and the average of the values of pixel P(x,y+1) and pixel P(x,y−1).

In accordance with the fourth embodiment as described above, motion of an image can be detected automatically based upon the difference between vertically arrayed pixel values contained in the image, thereby making it possible to select an image region to undergo highly efficient encoding.

[Fifth Embodiment]

A fifth embodiment of the invention in which the motion detector 107 has a different construction will now be described.

Figure 11:
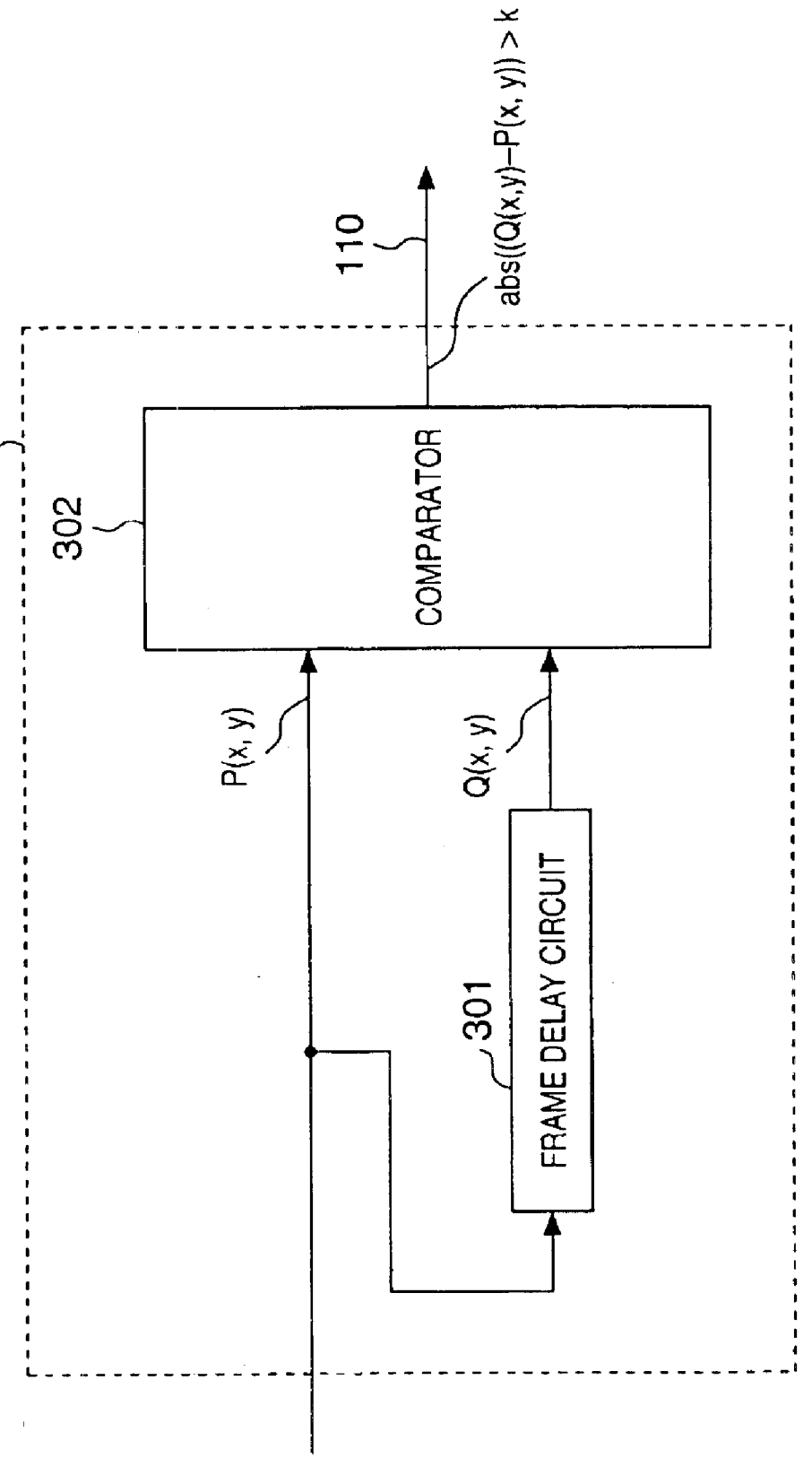
FIG. 11 is a block diagram illustrating the construction of a motion vector detector according to a fifth embodiment.

FIG. 11 is a block diagram illustrating an example of the construction of a motion vector detector 107a according to a fifth embodiment. This arrangement is used in a case where the input image signal is a progressive image signal typified by an image signal processed by a personal computer or the like.

As shown in FIG. 11, the motion detector 107a includes a frame delay circuit 301 for delaying the input image signal by one frame, and a comparator 302.

An image signal supplied from the image input unit 101 in FIG. 11 is applied to the comparator 302 directly via a path P(x,y) and indirectly via a path Q(x,y) through the frame delay circuit 301. The latter is a one-pixel delay circuit corresponding to one frame of the image signal. Accordingly, sets of pixels are supplied to the comparator 302 sequentially, each set comprising two pixels at identical positions in the immediately preceding frame and present frame. The comparator 302 compares the value of the pixel of the preceding frame with the value of the pixel of the present frame, determines whether the difference between the compared values exceeds a predetermined quantity and outputs the detection signal 110 if the predetermined quantity is exceeded. More specifically, the comparator 302 detects motion between frames in the progressive image signal and applies the result of detection to the region designation unit 106.

According to the fifth embodiment, therefore, the detection signal 110 is output as a high-level signal if the following relation holds:

$$abs\{Q(x,y)-P(x,y)\}>K \qquad (14)$$

where K represents a predetermined value. It should be noted that $abs\{(x,y)-P(x,y)\}$ in Equation (14) indicates the absolute value of the difference between the values of pixel Q(x,y) and pixel P(x,y).

In accordance with the fifth embodiment as described above, motion of an image can be detected automatically based upon the difference between pixel values from one frame of an image to the next, thereby making it possible to select an image region to undergo highly efficient encoding.

[Sixth Embodiment]

A block-based motion detection method is well known from the MPEG standard, etc., as a motion detection method other than those described above. The construction of an encoding apparatus using a motion detector that employs this block-based motion detection method also is covered by the scope of the present invention.

Figure 12:
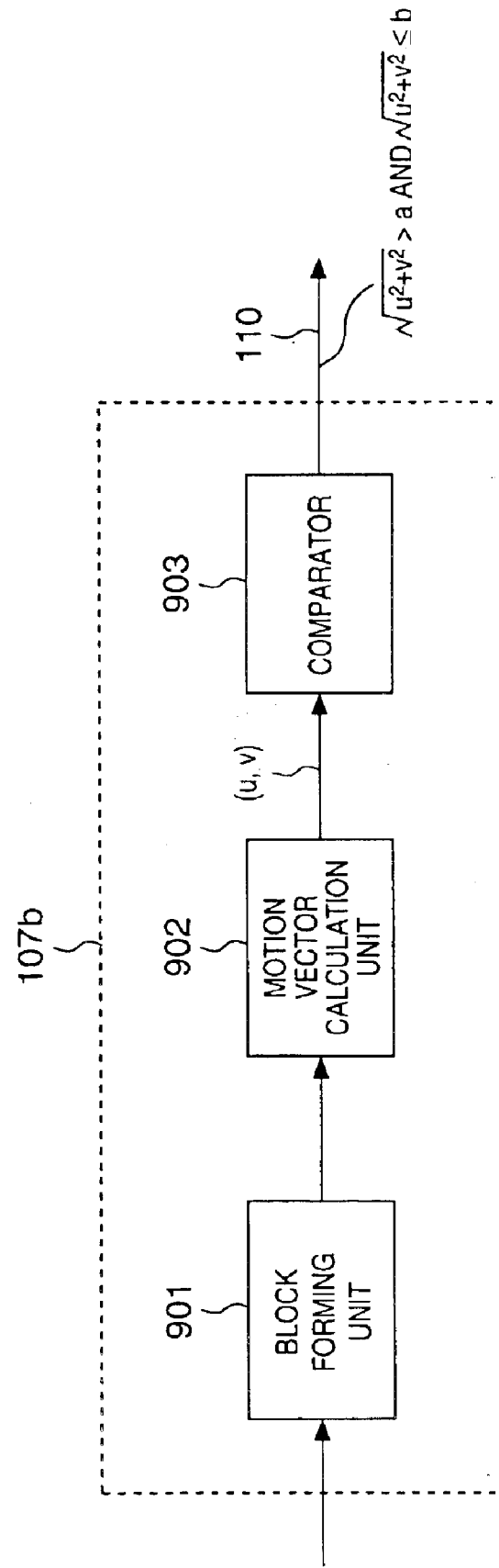
FIG. 12 is a block diagram illustrating the construction of a motion vector detector according to a sixth embodiment.

FIG. 12 is a block diagram illustrating an example of the construction of a motion vector detector 107b according to a sixth embodiment.

As shown in FIG. 12, the motion vector detector 107b includes a block forming unit 901, a motion vector calculation unit 902 and a comparator 903. The image signal supplied from the image input unit 101 is split into blocks each comprising 8×8 pixels by the block forming unit 901. The motion vector calculation unit 902 calculates a vector (u,v), which indicates, with regard to each individual block of the blocks output from the block forming unit 901, the position of the block relative to another block that has the highest degree of correlation. The comparator 903 compares the magnitude $[\sqrt{(u^2+v^2)}]$ of the vector (u,v) supplied from the motion vector calculation unit 902 with a first predetermined value a and a second predetermined value b, determines that significant motion regarding this block has been verified if the magnitude $[\sqrt{(u^2+v^2)}]$ of the vector is greater than the first predetermined value a and is equal to or less than the second predetermined value b, and outputs the detection signal 110 as a high level. More specifically, with regard to each block of pixels, the comparator 903 detects suitable motion defined by the predetermined upper and lower limit values a, b and supplies the result of detection to the region designation unit 106.

Thus, the region designation unit 106 receives the detection signal 110 from the motion detector 107 (107a, 107b) and, when the target image is subjected to the discrete wavelet transform, generates the region information 111 indicating which coefficients belong to the region in which motion has been detected and supplies the region information 111 to the quantizer 103.

The quantizer 103 quantizes the sequence of coefficients supplied from the discrete wavelet transformation unit 102. At this time the region that has been designated by the region information 111 from the region designation unit 106 is quantized upon shifting up the output of the quantizer 103 a predetermined number of bits or raising quantization precision a predetermined amount, this region of the image is compared with the image periphery and is encoded to a higher image quality. The output of the quantizer 103 thus obtained is supplied to the entropy encoder 104.

The entropy encoder 104 decomposes the data sequence from the quantizer 103 into bit planes, applies binary arithmetic encoding on a per-bit-plane basis and supplies the code output unit 105 with a code sequence indicative of the result of encoding. It should be noted that a multilevel arithmetic encoder that does not decompose data into bit planes or a Huffman encoder may be used to construct the entropy encoder without detracting from the effects of the present invention. Such an encoder also is covered by the scope of the present invention.

By virtue of this arrangement, a region of motion within an image is encoded to an image quality higher than that of the image periphery. This is to deal with video shot by a surveillance video camera or by a substantially stationary video camera that shoots everyday scenes. In most cases the main item of interest in such captured video resides in the region of the image where there is motion. By adopting the above-described arrangement, therefore, the portion of the image where the main item of interest appears can be encoded to an image quality that is higher than that of the other regions of the image such as the background thereof.

The converse arrangement, namely one in which an image region in which motion is not detected is designated as a target region for encoding at a higher performance, also is considered to be included as an embodiment of the present invention. Such an arrangement may be so adapted that a region for which the detection signal 110 is at the low level in the each of the foregoing embodiments is made the object of highly efficient encoding. With such an arrangement, a region exhibiting little motion in an image will be encoded more efficiently than other regions.

For example, consider video shot by a video camera tracking a moving subject such as an athlete. Here the background is detected as moving while the athlete being tracked by the camera exhibits little motion. By designating the image region in which motion is not detected as a region to undergo highly efficient encoding, an athlete that is the subject of photography in a sports scene can be encoded to an image quality higher than that of the background.

In accordance with the sixth embodiment, as described above, a region exhibiting motion in an image can be detected automatically and an image region to which highly efficient encoding is to be applied can be selected.

[Seventh Embodiment]

The present invention covers also an arrangement in which whether the region designation unit 106 outputs the region information 111 for a region in which motion has been detected or for a region in which motion has not been detected is switched in conformity with a change in the shooting conditions.

Figure 13:
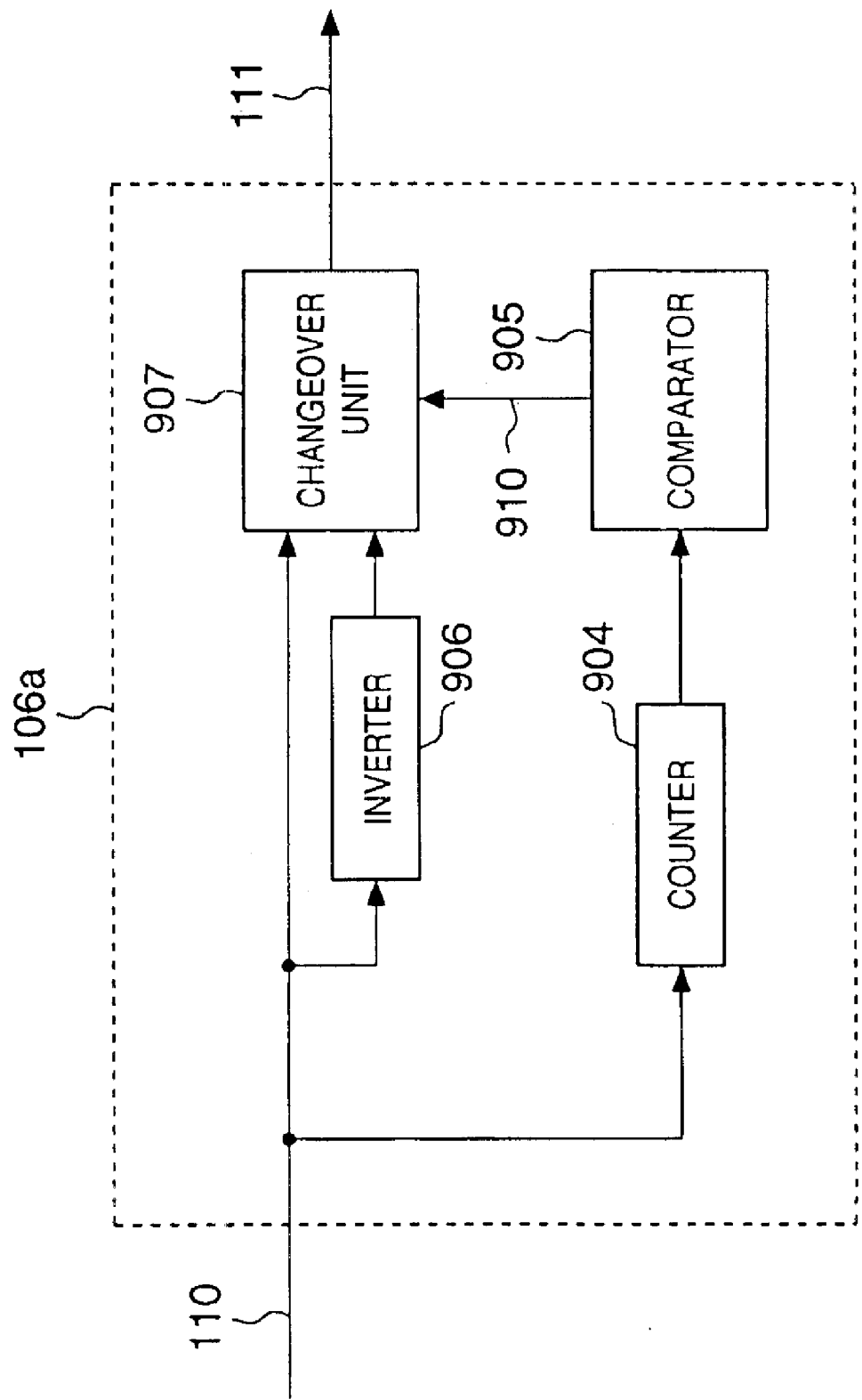
FIG. 13 is a block diagram illustrating the construction of an region designation unit according to a seventh embodiment.

FIG. 13 is a block diagram illustrating an example of the construction of a region designation unit 106a according to the seventh embodiment for changing over the region designating operation automatically in dependence upon the shooting conditions.

As shown in FIG. 13, the region designation unit 106a includes a counter 904, a comparator 905, an inverter 906 and a changeover unit 907.

The detection signal 110 indicative of the result of detection by the motion detector 107 (107a, 107b) is applied to the counter 904. On the basis of the detection signal 110, the counter 904 counts the number of pixels contained in the image region that exhibits the detected motion. The detection signal 110 varies pixel by pixel, as described earlier. Therefore, by counting the number of times the detection signal 110 changes in accordance with the level of the detection signal 110, the number of pixels contained in the image region that exhibits motion can be obtained. The comparator 905 compares the pixel count obtained by the counter 904 with a predetermined value and applies a control signal 910 to the changeover unit 907. The changeover unit 907 is further supplied with the detection signal 110 indicative of the region in which motion has been detected, and a signal obtained by inverting the detection signal 110 by the inverter 906, namely a signal indicative of an image region in which motion has not been detected. If the comparator 905 finds that the number of pixels in the image region in which motion has been detected is equal to or less than a predetermined value, the changeover unit 907 selects and outputs the region information 111 based upon the detection signal 110 indicative of the image region in which motion has been detected. Conversely, if the comparator 905 finds that the number of pixels counted is greater than the predetermined value, then the changeover unit 907 selects and outputs the region information 111 based upon the output of the inverter 906, namely the image region in which motion has not been detected, in order that this region will be encoded to a high image quality.

In accordance with the seventh embodiment, as described above, a region in which image motion has been detected or a region in which image motion has not been detected can be selected in dependence upon the characteristics of the image as an image region to undergo highly efficient encoding.

The encoding apparatus according to the above-described embodiment is effective for highly efficient encoding of a moving image. However, by treating a single image in a sequence of moving images as a still image, the apparatus can be applied to highly efficient encoding of this still image. Such an arrangement also is covered by the scope of the present invention.

In each of the foregoing embodiments, hardware implementation of the various components is taken as an example. However, this does not impose a limitation upon the present invention because the operations of these components can be implemented by a program executed by a CPU.

Further, though each of the foregoing embodiments has been described independently of the others, this does not impose a limitation upon the invention because the invention is applicable also to cases where these embodiments are suitably combined.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments and the storage medium storing the program codes constitutes the invention. Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiments.

Thus, in accordance with the embodiments as described above, a region of interest can be extracted from multilevel image data at high speed. As a result, it is possible to provide an image encoding method and apparatus capable of adaptively selecting encoding processing that differs for each region of an image.

The present invention is not limited to the above embodiments and various changes and modifications can be made within the spirit and scope of the present invention. Therefore, to apprise the public of the scope of the present invention, the following claims are made.

What is claimed is:

1. An image encoding apparatus for encoding image signals of a plurality of frames, comprising:
   input means for inputting an image signal including pixel values of a frame;
   transformation means for applying a discrete wavelet transform to the image signal of each frame and outputting transformed coefficients for each frame;
   motion detection means for detecting motion of an image based upon the image signals of plural frames;
   counting means for counting a number of pixels based upon information indicating motion of the image detected by said motion detection means;
   selection means for selecting a method of designating an area of the image based upon information indicating motion of the image detected by said motion detection means, the selection being based upon the number of pixels counted by said counting means, and for designating a region of the image of the frame based upon the information;
   quantization means for quantizing the transformed coefficients of each frame so as to differentiate an image quality of the image of the designated region from an image of other regions, and outputting a quantized image signal; and
   encoding means for encoding the quantized image signal quantized by said quantization means.

2. The apparatus according to claim 1, wherein said motion detection means detects motion of the image in accordance with a difference between pixel values of two mutually adjacent pixels vertically of the image signal.

3. The apparatus according to claim 1, wherein said motion detection means detects motion of the image in accordance with a difference between pixel values of corresponding pixels in two successive frames of the image signal.

4. The apparatus according to claim 1, wherein said motion detection means includes:
   block calculation means for forming the image signal into blocks and calculating motion vectors on a block-by-block basis; and
   detection means for detecting motion of the image based upon whether magnitude of a motion vector calculated by said block calculation means is greater than a predetermined value.

5. The apparatus according to claim 1, wherein said quantization means performs quantization upon raising quantization precision of the image region designated by said region designation means.

6. The apparatus according to claim 1, wherein said encoding means decomposes a data sequence, which is supplied from said quantization means, into bit planes, applies binary arithmetic encoding on a per-bit-plane basis and outputs code sequences giving priority to code sequences that correspond to bit planes of higher order bits.

7. An image encoding method for intra-frame encoding image signals of a plurality of frames, comprising:
   an input step of inputting an image signal including pixel values of a frame;
   a transformation step of applying a discrete wavelet transform to the image signal of each frame and outputting transformed coefficients of the each frame;
   a motion detection step of detecting motion of an image based upon the image signals of plural frames;
   a counting step of counting a number of pixels based upon information indicating motion of the image detected in said motion detection step;
   a selection step of selecting a method of designating an area of the image based upon the information indicating motion of the image detected in said motion detection step, the selection being based upon the number of pixels counted in said counting step, and for designating a region of the image of the frame based upon the information;
   a quantization step of quantizing the transformed coefficients of each frame so as to differentiate an image quality of an image of the designated region from an image of other region, and outputting a quantized image signal; and
   and encoding step of encoding the quantized image signal quantized in said quantization step.

8. The method according to claim 7, wherein said motion detection step detects motion of the image in accordance with a difference between pixel values of two mutually adjacent pixels vertically of the image signal.

9. The method according to claim 7, wherein said motion detection step detects motion of the image in accordance with a difference between pixel values of corresponding pixels in two successive frames of the image signal.

10. The method according to claim 7, wherein said motion detection step includes:
   a block calculation step of forming the image signal into blocks and calculating motion vectors on a block-by-block basis; and
   a detection step of detecting motion of the image based upon whether magnitude of a motion vector calculated at said block calculation step is greater than a predetermined value.

11. The method according to claim 7, wherein said quantization step performs quantization upon raising quantization precision of the image region designated at said region designation step.

12. The method according to claim 7, wherein said encoding step decomposes a data sequence, which is supplied by said quantization step, into bit planes, applies binary arithmetic encoding on a per-bit-plane basis and outputs code sequences giving priority to code sequences that correspond to bit planes of higher order bits.

13. A computer-readable storage medium storing a program for implementing an image encoding method of encoding image signals of a plurality of frames, the program comprising the steps of:
   inputting an image signal including pixel values of a frame;

applying a discrete wavelet transform to the image signal of each frame and outputting transformed coefficients of the each frame;

detecting motion of an image based upon the image signals of plural frames;

counting a number of pixels based upon information indicating motion of the image detected in said detecting step;

selecting a method of designating an area of the image based upon information indicating motion of the image detected in said detecting step, the selection being based upon the number of pixels counted in said counting step, and of designating a region of the image of the frame based upon the information;

quantizing the transformed coefficients of each frame so as to differentiate an image quality of the image of the designated region from an image of other regions, and outputting a quantized image signal; and encoding the quantized image signal quantized in said quantizing step.

* * * * *